(12) United States Patent
Becker et al.

(10) Patent No.: US 7,174,936 B2
(45) Date of Patent: Feb. 13, 2007

(54) SOLID SUSPENDED WORK MACHINE TIRE

(75) Inventors: Dan J. Becker, Peoria, IL (US); Sunil I. Mathew, Louisville, KY (US); Eugene Y. Grinberg, Morton, IL (US)

(73) Assignee: Caterpillar Inc, Peoria, IL (US)

( * ) Notice: Subject to any disclaimer, the term of this patent is extended or adjusted under 35 U.S.C. 154(b) by 127 days.

(21) Appl. No.: 10/864,898

(22) Filed: Jun. 9, 2004

(65) Prior Publication Data
US 2005/0133133 A1 Jun. 23, 2005

Related U.S. Application Data

(63) Continuation-in-part of application No. 29/196,261, filed on Dec. 22, 2003, now Pat. No. Des. 507,522.

(51) Int. Cl.
*B60C 7/00* (2006.01)
(52) U.S. Cl. .................. 152/325; 152/246; 152/328
(58) Field of Classification Search ........ 152/323–329, 152/5, 7, 302, 246, 316, 318–322
See application file for complete search history.

(56) References Cited

U.S. PATENT DOCUMENTS

| | | | |
|---|---|---|---|
| 654,169 A | 7/1900 | Macneil | |
| 965,922 A | 8/1910 | Merigoux | |
| 982,634 A | 1/1911 | Reed | |
| 1,026,468 A | 5/1912 | Selzer | |
| 1,040,074 A | 10/1912 | Weiss | |
| 1,113,912 A * | 10/1914 | Roesel et al. | 152/321 |
| 1,165,512 A * | 12/1915 | Jordan | 152/319 |
| 1,195,379 A | 8/1916 | Mead | |
| 1,258,573 A | 3/1918 | Johnstone | |
| 1,365,539 A | 1/1921 | Pepple | |
| D57,136 S | 2/1921 | Lambert | |
| 1,386,512 A | 8/1921 | Lambert | |
| 1,402,190 A | 1/1922 | Swinehart | |
| 1,402,947 A | 1/1922 | Myers | |
| 1,414,252 A | 4/1922 | Brubaker | |
| 1,423,580 A * | 7/1922 | Robbins et al. | 152/322 |
| 1,430,100 A | 9/1922 | Mitchell | |
| 1,444,892 A * | 2/1923 | Westgate et al. | 152/316 |
| 1,462,760 A | 7/1923 | Krusemark | |

(Continued)

FOREIGN PATENT DOCUMENTS

DE 123458 10/1899

(Continued)

*Primary Examiner*—Jason R. Bellinger
(74) *Attorney, Agent, or Firm*—Liell & McNeil (57) ABSTRACT

A work machine tire includes an annular body of elastomeric material that includes a middle radial region. A plurality of unpressurized cavities are defined by the middle radial region and are distributed in a pattern that includes a first radial band of cavities and a second radial band of cavities. Each cavity of the first radial band of cavities is oriented at a positive angle with respect to a radius therethrough, and each cavity of the second radial band of cavities is oriented at a negative angle with respect to a radius therethrough. A material volume of the middle radial region is more than one and a half times greater than the combined void volume of the plurality of cavities.

26 Claims, 11 Drawing Sheets

U.S. PATENT DOCUMENTS

| | | | |
|---|---|---|---|
| 1,469,020 A * | 9/1923 | Preston | 152/52 |
| 1,485,573 A | 3/1924 | Swinehart | |
| 1,524,718 A | 2/1925 | Leach | |
| 1,526,503 A | 2/1925 | Preston | |
| D68,536 S | 10/1925 | Lenhoff | |
| 1,570,048 A | 1/1926 | Dickensheet | |
| 1,572,440 A | 2/1926 | Lambert | |
| 1,584,785 A | 5/1926 | McCollough | |
| 1,591,982 A | 7/1926 | Kirkwood | |
| 1,597,381 A | 8/1926 | Lambert | |
| 1,616,843 A | 2/1927 | Brubaker | |
| 1,617,870 A * | 2/1927 | Snider | 152/326 |
| 1,618,843 A | 2/1927 | Brubaker | |
| 1,624,856 A | 4/1927 | Bauman | |
| 1,641,150 A | 9/1927 | Brubaker | |
| 1,662,007 A | 3/1928 | Kuhike | |
| 1,670,827 A | 5/1928 | Seiberling | |
| 1,678,014 A | 7/1928 | Manly | |
| 1,678,631 A | 7/1928 | Barker | |
| 1,702,081 A | 2/1929 | Hatfield | |
| D82,002 S | 9/1930 | Shoemaker | |
| 2,603,267 A | 7/1952 | Simpson | |
| 2,620,844 A | 12/1952 | Lord | |
| 2,742,941 A | 4/1956 | Johnson | |
| 3,188,775 A | 6/1965 | Cosmos | |
| 3,219,090 A | 11/1965 | Cislo | |
| 3,822,732 A | 7/1974 | Ferguson et al. | |
| 4,037,635 A | 7/1977 | Ippen et al. | |
| 4,226,273 A | 10/1980 | Long et al. | |
| 4,762,739 A | 8/1988 | Kraus | |
| 4,784,201 A | 11/1988 | Palinkas et al. | |
| 4,832,098 A | 5/1989 | Palinkas et al. | |
| 4,921,029 A | 5/1990 | Palinkas et al. | |
| 4,934,425 A | 6/1990 | Gajewski et al. | |
| 4,945,962 A | 8/1990 | Pajtas | |
| 4,998,980 A | 3/1991 | Katou | |
| D317,584 S | 6/1991 | Tsutsumi | |
| 5,042,544 A | 8/1991 | Dehasse | |
| 5,078,454 A | 1/1992 | Rollinson | |
| 5,087,103 A | 2/1992 | Pompier | |
| 5,139,066 A | 8/1992 | Jarman | |
| D329,413 S | 9/1992 | Chandler | |
| 5,154,490 A | 10/1992 | Burns | |
| 5,174,634 A | 12/1992 | Blanck et al. | |
| 5,223,599 A | 6/1993 | Gajewski | |
| 5,265,659 A | 11/1993 | Pajtas et al. | |
| 5,343,916 A | 9/1994 | Duddey et al. | |
| 5,390,985 A | 2/1995 | Chandler | |
| D401,896 S | 12/1998 | Chandler et al. | |
| D410,603 S | 6/1999 | Chandler et al. | |
| D414,724 S | 10/1999 | Lu | |
| 6,068,353 A | 5/2000 | Juncker et al. | |
| D455,996 S | 4/2002 | Buckley | |
| 6,834,696 B1 * | 12/2004 | Yurjevich et al. | 152/517 |
| 6,845,796 B2 * | 1/2005 | Katoh et al. | 152/209.1 |
| 2002/0092589 A1 | 7/2002 | Katoh et al. | |

FOREIGN PATENT DOCUMENTS

| | | |
|---|---|---|
| FR | 386344 | 4/1908 |
| FR | 558332 | 11/1922 |
| FR | 567280 | 6/1923 |
| GB | 185988 | 9/1922 |
| GB | 392299 | 10/1932 |

* cited by examiner

SOLID SUSPENDED WORK MACHINE TIRE

RELATION TO OTHER PATENT

This application is a continuation-in-part of patent application Ser. No. 29/196,261, filed on Dec. 22, 2003 now U.S. Pat. No. D, 507,522.

TECHNICAL FIELD

The present disclosure relates generally to work machine tires, and more specifically to non-pneumatic work machine tires.

BACKGROUND

Because work machines often operate in harsh environments and are continuously cycling through no load and relatively heavy loads, work machine tires must be durable and not susceptible to flats. In fact, it has been found that although conventional pneumatic tires provide a smooth ride, pneumatic tires often are less durable than solid tires. However solid tires are known to provide a less than smooth ride.

In order to provide sufficient durability, work machine tires can be non-pneumatic, and thus, are comprised of solid or semi-solid products. Although the non-pneumatic work machine tires are more durable than pneumatic tires, the non-pneumatic tires are often too stiff to provide a smooth ride and lack the contact area with the ground to provide relatively good traction. In order to improve the ride of the work machine, some non-pneumatic tires include a radial band of unpressurized cavities, or recesses. The radial band lessens the stiffness and increases the deformation of the tire so it will ride better than a solid tire. Such a tire is sold by MITL under a trademark that suggests flexibility, but it still provides a stiff ride more similar to a solid tire than a pneumatic tire.

In another example, the non-pneumatic tire described in U.S. Pat. No. 5,042,544, issued to Dehasse, on Aug. 27, 1991, defined a radial band of recesses that enable the tire to deform due to a load and provides an area of contact with the road that is supposedly similar to that provided by a pneumatic tire. Further, in order to better control the deformability of the tire and to limit the collapse of the recesses, the recesses of the Dehasse non-pneumatic tire are taught as being intrinsically dissymmetrical to any radial direction and overlap one another. Although the Dehasse non-pneumatic tire uses recesses in order to control the tire performance and road handling, the Dehasse tire is intended to have a weight and bulk similar to that of pneumatic tires. Thus, the Dehasse tire would not possess the durability required for high load, low speed work machine applications.

Work machine tires are also subjected to tangential forces, such as braking and traction forces, and widely varying radial forces associated with payload. A single radial band of cavities, especially those that are angled, would exhibit unequal clockwise and counterclockwise torsional stiffness. In addition, they would have the tendency to rotate the outer portion of the tire relative to the hub as radial load is varied. This torsional stiffness bias could result in undesirable and unpredictable work machine motion.

The present disclosure is directed at overcoming one or more of the problems set forth above.

SUMMARY OF THE DISCLOSURE

In one aspect, a work machine tire includes an annular body of elastomeric material. A radial middle region of the elastomeric material defines a plurality of unpressurized cavities distributed in a pattern that includes a first radial band of cavities and a second radial band of cavities. Each cavity of the first radial band of cavities is oriented at a positive angle with respect to a radius therethrough, and each cavity of the second radial band of cavities is oriented at a negative angle with respect to a radius therethrough. In one aspect, a material volume of the radial middle region is more than one and a half times greater than a combined void volume of the plurality of unpressurized cavities. In another aspect, each of the cavities is defined by first and second arches connected by first and second deflectable wall portions.

DETAILED DESCRIPTION

Figures 1, 1A:
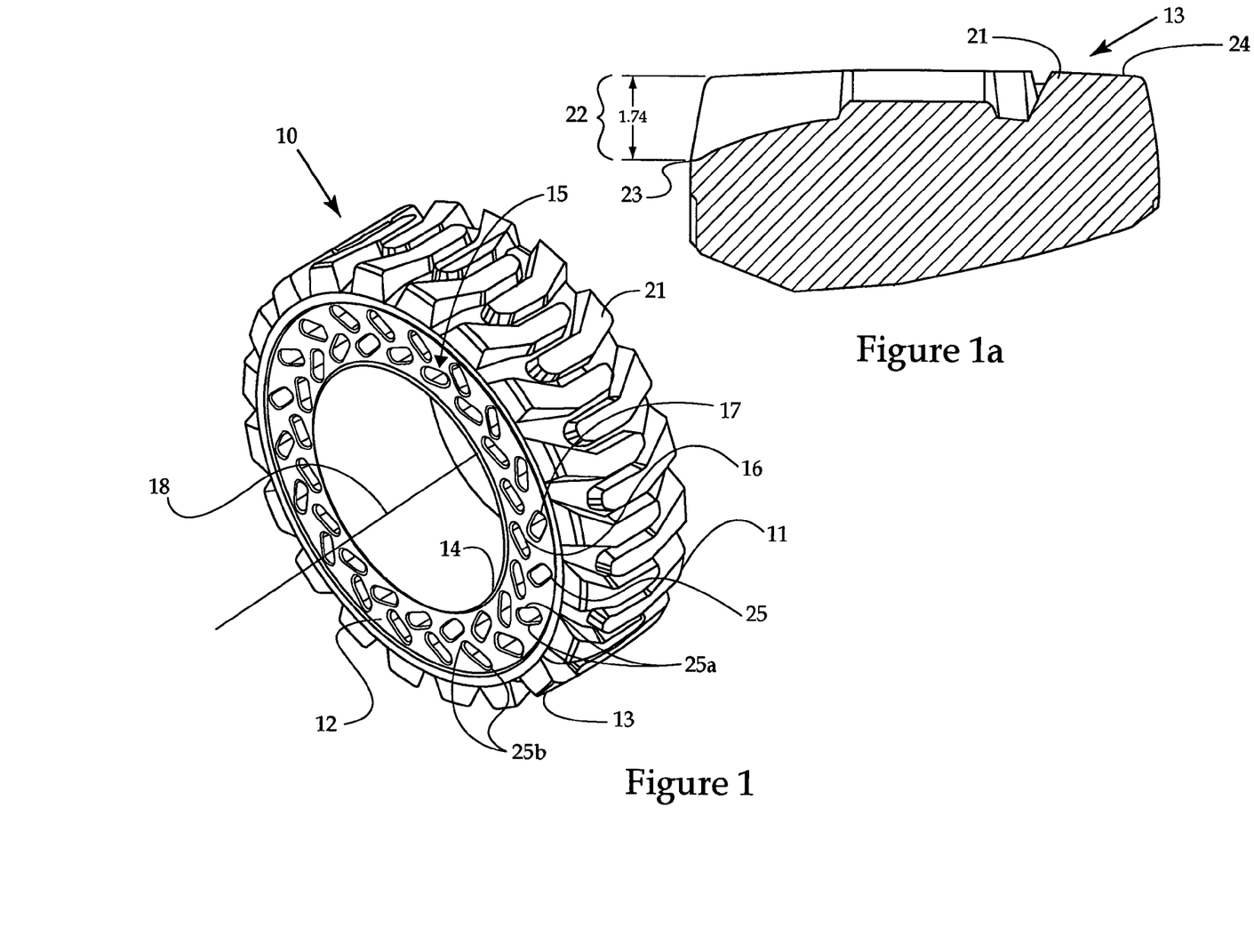
FIG. 1 is an isometric view of a work machine tire, according to a preferred embodiment of the present disclosure.
FIG. 1a is a cross-sectioned view of a radial outer or tread region of the work machine tire of FIG. 1.

Referring to FIG. 1, there is shown an isometric view of a work machine tire 10, according to a preferred embodiment of the present disclosure. Although all work machine tires 10, 110, 210, 310, 410 and 510 illustrated in the six embodiments are 31 inch diameter tires designed for a skid steer loader, those skilled in the art will appreciate that the present disclosure contemplates tires of various sizes that can be used with other various work machines, preferably with relatively small work machines, such as small wheel loaders, backhoe loaders and maybe trucks, but other larger work machines are still suitable. The work machine tire 10 includes an annular body 11 of elastomeric material. Although the annular body 11 could be made from various elastomeric materials, the annular body 11 is illustrated as being made from rubber of any suitable tire formulation known in the art. For example, tire 10 might be molded from a natural rubber or a natural/synthetic rubber blend having a Young's Modulus between 1 MPa and 6 MPa at 100% elongation. For the preferred embodiments shown, a 100% tensile modulus of about 2.75 MPa is used. Fully synthetic elastomers, such as polyurethanes could also be used. The annular body 11 includes a radial middle region 12, and preferably a radial outer region 13 and a radial inner region 14, both of which are adjacent to the radial middle region 12. The radial inner region 14 attaches to a wheel hub in a conventional manner, such as by being directly bonded thereto, and the wheel is attached to the work machine. The radial outer region includes the tread.

The radial outer region 13 and the radial inner region 14 are preferably, but not necessarily cavity-free, and the radial middle region 12 defines a plurality of unpressurized cavities 15 that are distributed in a pattern that includes a first radial band of cavities 16 and a second radial band of cavities 17. The bands may or may not overlap, depending upon the desired properties of the particular application. As illustrated, the cavities 15 are evenly spaced throughout each radial band 16 and 17. Each cavity within the first radial band of cavities 16 is oriented at a positive angle with respect to a radius therethrough, and each cavity within the second radial band of cavities 17 is oriented at a negative angle with respect to a radius therethrough. The first and second radial bands of cavities 16 and 17 are oriented at opposing angles in order to cancel or reduce any torsional stiffness bias created by each radial band of cavities 16 and 17. Without the first radial band of cavities 16 canceling the torsional stiffness bias of the second radial band of cavities 17, and vice versa, a tangential force acting in a forward direction on the work machine tire 10, when compared with the reverse direction, might cause a significantly different degree of rotation of an outer portion of the work machine tire 10 to rotate with respect to an inner portion. This could result in unpredictable work machine motion during acceleration, stopping, pulling, pushing, digging, or any other work cycle that could produce a tangential force on the tire. In the illustrated preferred embodiment, the positive angle is 63° and the negative angle is 52° with respect to a radial line through the center of the cavity. However, those skilled in the art appreciate that the positive and negative angles can vary, and are determined based on various factors, including but not limited to, the size and shape of cavities within the first radial band and the second radial band. Moreover, although the positive angle of the first radial band 16 is preferably different than the negative angle of the second radial band 17, those skilled in the art will appreciate that the positive angle and the negative angle could be the same. However, to do so, the shape and/or size and/or number of the cavities within the first radial band may need to be different than the shape and/or size and/or number of cavities in the second radial band in order to generate similar performance. When scaling, the number of cavities is preferably proportional to the diameter of the tire.

The work machine tire 10 includes less than fifty unpressurized cavities 15. In the illustrated preferred embodiment of FIG. 1, the work machine tire 10 includes forty unpressurized cavities 15, with twenty unpressurized cavities within each of the first and second radial bands 16 and 17. Preferably, each of the unpressurized cavities within the plurality 15 have an axis of symmetry parallel to a tire axis of rotation 18. Although the plurality of unpressurized cavities 15 preferably have a uniform shape and volume, it should be appreciated that the first radial band of cavities could have a different shape than the second radial band of cavities. For instance, if the first and second radial bands were oriented at the similar positive and negative angles, the shape and/or size of the first radial band may differ from the shape and/or sizes of the second radial band. Although the present disclosure contemplates various shapes of the cavities, the uniform shape illustrated includes a cross-sectional shape with a perimeter 25 that includes a pair of straight wall portions 25a separated by a pair of arches 25b. The length and width of the cross-sectional shape can vary depending on various factors, including but not limited to, the desired combined void volume. In the preferred embodiment, the length of the cavities 15 is illustrated as approximately 2.3 inches, the width is approximately 0.9 inch, and the depth is approximately 4.9 inches if extending half the tire width, but may be 9.8 inches if extending the full width of the tire.

Referring to FIG. 1a, there is shown a cross-sectioned view of the radial outer region 13 of the work machine tire 10. The radial outer region 13 includes an exposed off-road tread pattern 21 that has a depth 22, which is the distance between a base 23 and a top 24 of the tread 21. The view of FIG. 1a and similar views in the other drawings show the theoretical intersection of the side profile and the crown at the corners; it may not reflect the maximum diametrical location on the tire. Although maximum tread depth is desirable for traction and wear purposes, the tread depth 22 is limited by the overall desired diameter of the tire 10. Those skilled in the art will appreciate that the larger the material volume between the outer radial band of cavities, illustrated in FIG. 1a as the second radial band of cavities 17, and the outer diameter of the tire, the greater the possible tread depth 22. Thus, in order to maintain the diameter of a work machine tire while increasing the tread depth, the pattern of cavities can be made more compact or the number of cavities limited, which, in return, could affect the desired stiffness and rubber strain of the tire under a load. Therefore, the tread depth 22 is typically a compromise between the desired traction, stiffness and rubber strain of the tire 10. Preferably, in all embodiments for the 31 inch tire for the skid steer loader, the depth 22 of the off-road tread pattern 21 is at least one inch. In the preferred embodiment illustrated in FIG. 1a, the off-road tread is 1.74 inches deep. Those skilled in the art will appreciate that the off-road tread 21 should be sufficient for the operation of work machine tire 10 in off-road environments.

Figure 1B:
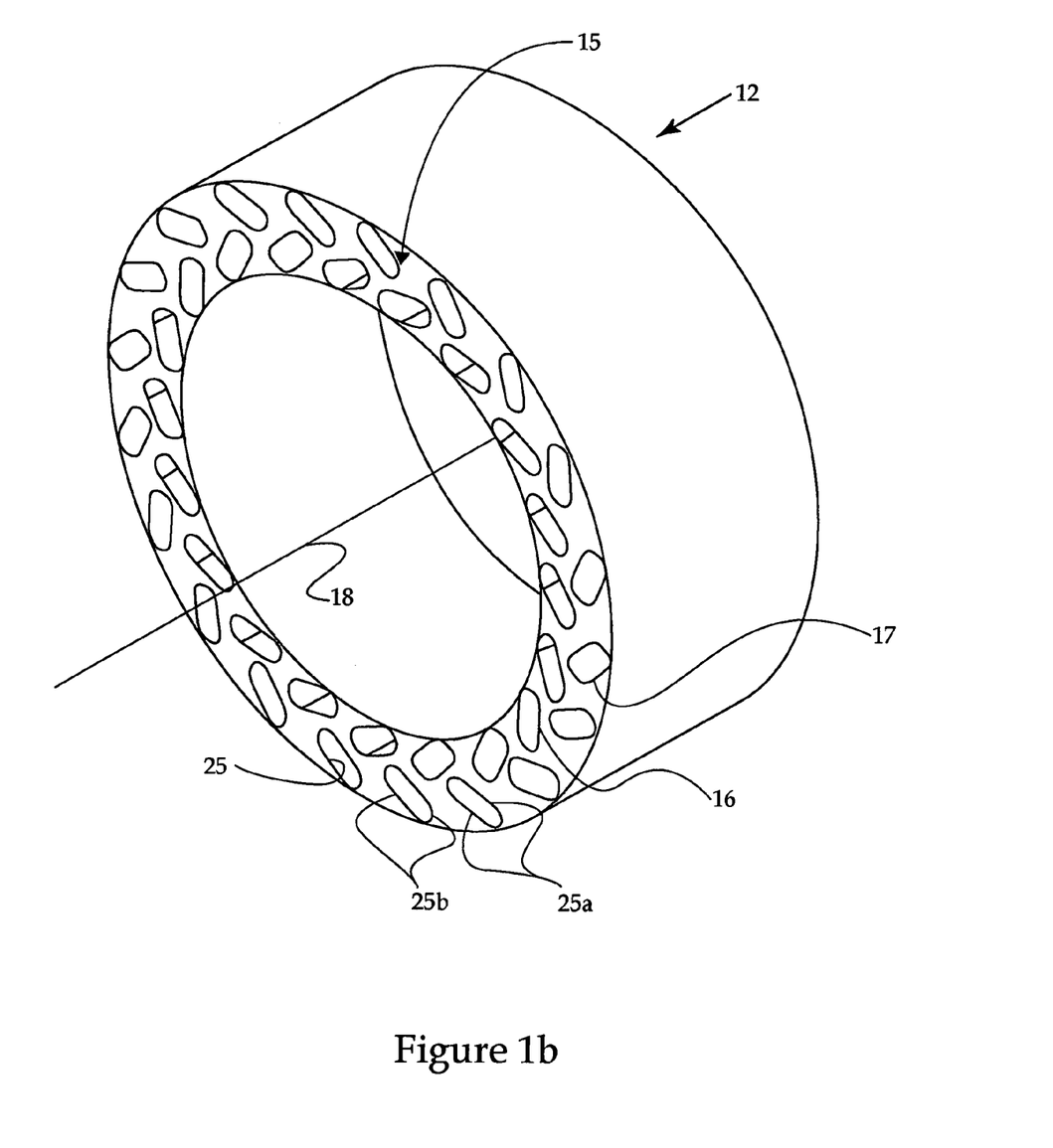
FIG. 1b is an isometric view of a radial middle region of the work machine tire of FIG. 1.

Referring to FIG. 1b, there is shown an isometric view of the radial middle region 12 of the work machine tire 10. The radial middle region 12 includes a material volume, and the plurality of unpressurized cavities 15 have a combined void volume. For purposes of this disclosure, radial middle region is bounded by an inner diameter that is tangent to the inner band of cavities 16, and bounded by an outer diameter tangent to the outer band of cavities 17. Although a ratio of the material volume to the combined void volume may vary, the material volume is more than one and a half times greater than a combined void volume of the plurality of unpressurized cavities 15. In the preferred version of the tire, the material volume of the middle radial region 12 is about twice the combined void volume. Those skilled in the art will appreciate that the cavities 15 within the tire 10 lessen the stiffness of the tire 10 in order to provide deflection and a relatively smooth ride for the operator the load and the work machine. Moreover, the cavities 15 permit the material to deflect by bending, rather than by either pure compression or stretching, thereby limiting the material strain while permitting substantial deflections. However, the work machine tire 10 must include sufficient material in order to carry the loads to which the work machine is subjected. Thus, the determination of the material volume to the combined void volume ratio is a compromise between various known factors, including but not limited to the desired stiffness and strain and durability of the work machine tire.

Figures 2, 2A:
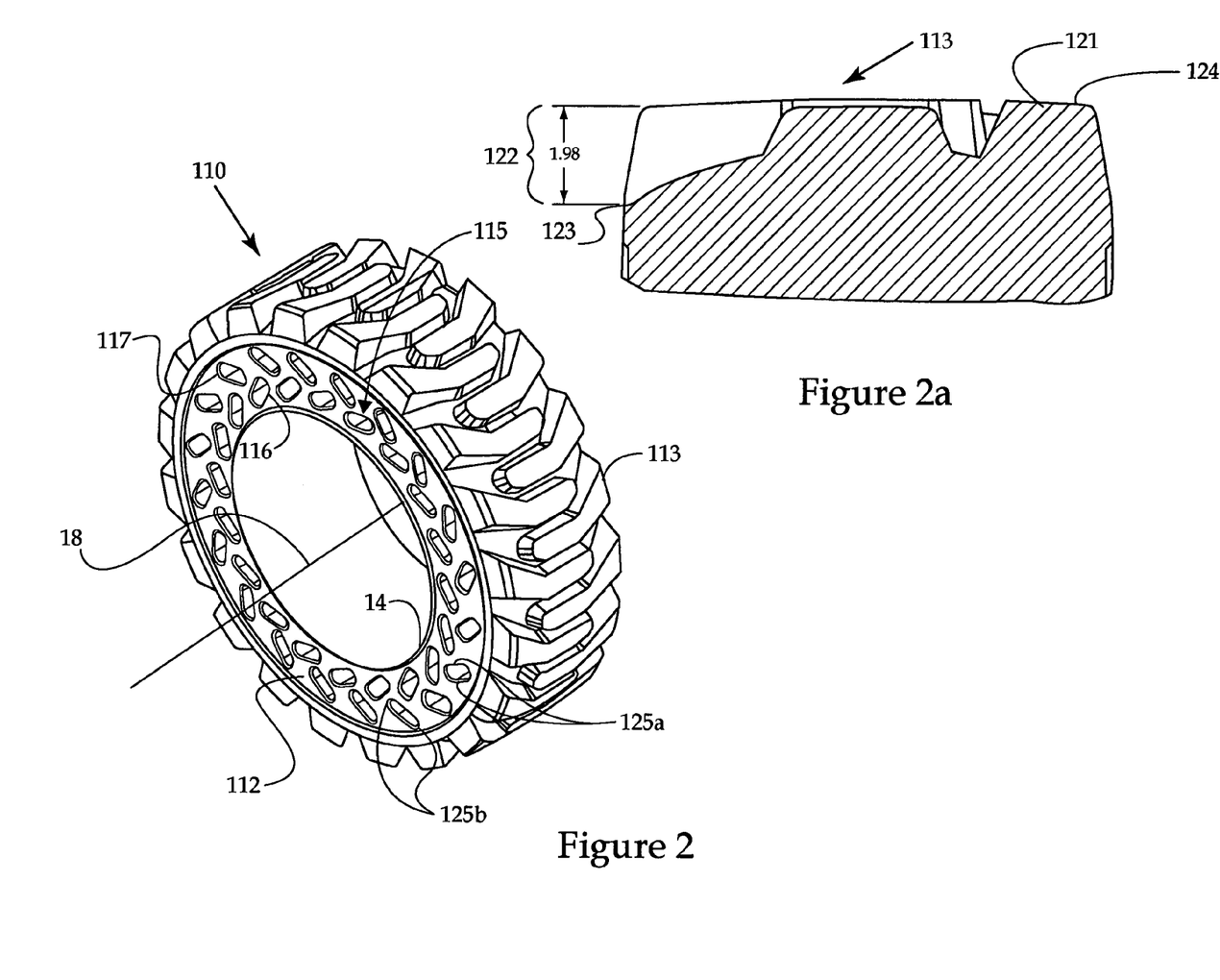
FIG. 2 is an isometric view of a work machine tire, according to a second embodiment of the disclosure.
FIG. 2a is a cross-sectioned view of a radial outer or tread region of the work machine tire of FIG. 2.

Referring to FIG. 2, there is shown an isometric view of a work machine tire 110, according to a second embodiment of the present disclosure. The work machine tire 110 of the second embodiment is similar to the work machine tire 10 of the preferred embodiment except the material volume to the combined void volume ratio of the work machine tire 110 is greater than that of the preferred embodiment. The material volume of the radial middle region 112 is 2.1 times greater (which is still about twice) than the combined void volume of the plurality of unpressurized cavities 115. Being that both work machine tires 10 and 110 include twenty cavities in each of their respective fie first and second radial bands 16, 116 and 17, 117, the material volume to combined void volume ratio is greater because the size of each cavity within the plurality 115 is smaller. In the illustrated second embodiment, each cavity within the plurality 115 includes a length of 2.2 inches, a width of 0.9 inch, and a depth of 4.9 inches for halfway through (9.8 inches if full width of tire).

Referring to FIG. 2a, there is shown a cross-sectioned view of a radial outer region 113 of the work machine tire 110 of FIG. 2. Similar to the preferred embodiment, the radial outer region 113 includes an exposed off-road tread pattern 121 that has a depth 122 defined as the distance between a base 123 of the tread 121 and a top 124 of the tread 121. Whereas the depth 22 of the off-road tread pattern 21 of FIG. 1 was 1.74 inches, the depth 122 of the off-road tread pattern 121 of the second embodiment is 1.98 inches. Being that the second embodiment includes a greater material volume to void volume ratio, the work machine tire 10 can support a thicker off-road tread 121 than in the preferred embodiment. However, the higher material volume to void volume ratio may result in an increased stiffness that can affect the smoothness of the work machine ride.

Figures 3, 3A:
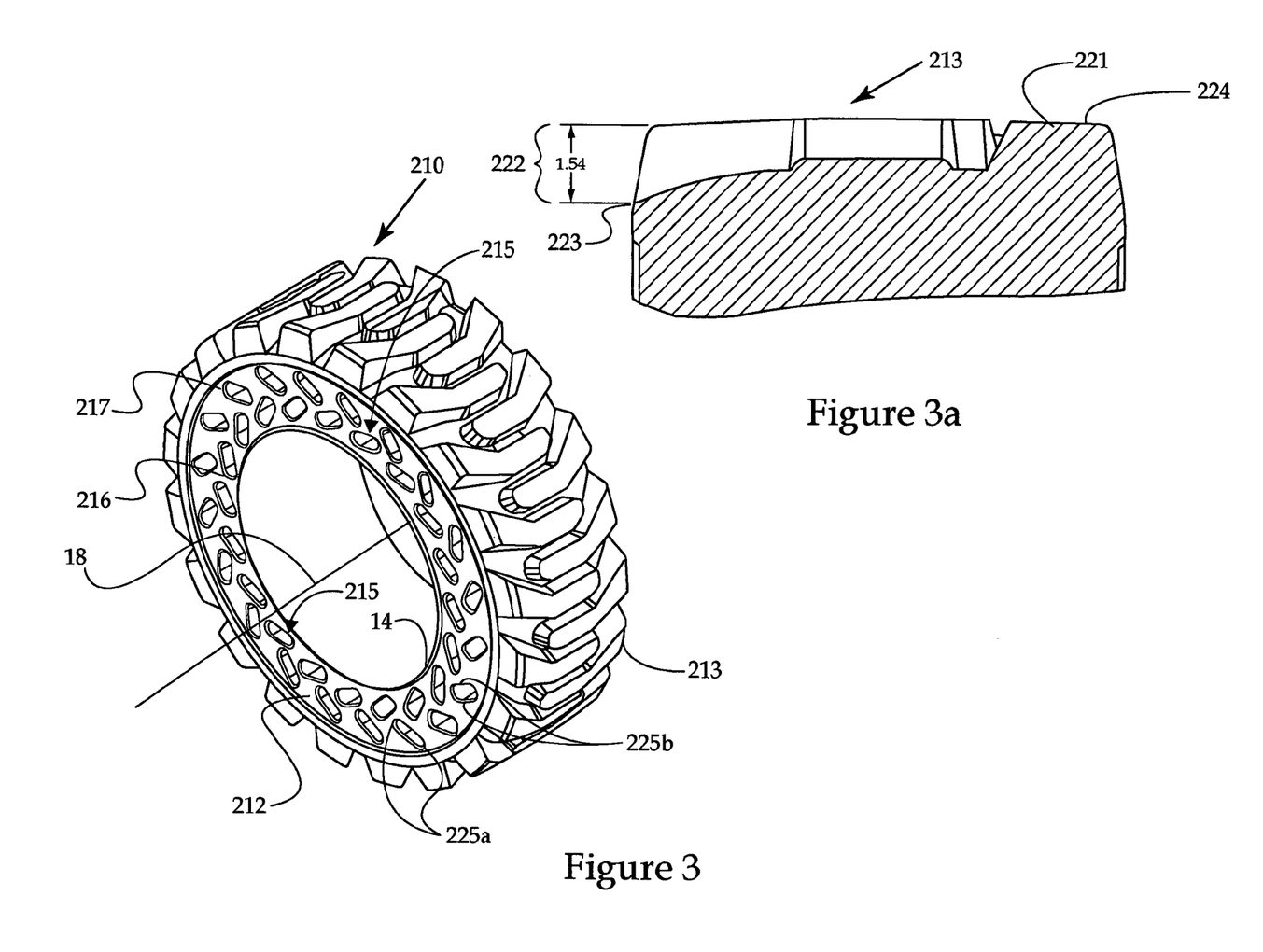
FIG. 3 is an isometric view of a work machine tire, according to a third embodiment of the disclosure.
FIG. 3a is a cross-sectioned view of a radial outer or tread region of the work machine tire of FIG. 3.

Referring to FIG. 3, there is shown a work machine tire 210, according to a third embodiment of the present disclosure. The work machine tire 210 is similar to the work machine tires 10 and 110 of the preferred and second embodiments except that a material volume to a combined void volume ratio of the work machine tire 210 is less than that of the preferred and the second embodiments. A radial middle region 212 of the work machine tire 210 includes the material volume that is 1.8 times greater (which is still about twice) than the combined void volume of the plurality of cavities 215. Each cavity within the plurality 215 includes a length of 2.3 inches, a width of 1.1 inches, and a depth of 4.9 inches for half way through (9.8 inches if full width of tire).

Referring to FIG. 3a, there is shown a cross-sectioned view of a radial outer region 213 of the work machine tire 210 of FIG. 3. As with the preferred and second embodiments, the radial outer region 213 includes an exposed off-road tread 221 that includes a depth 222 defined as the distance between a base 223 and a top 224 of the tread 221. The depth 222 of the tread 221 is 1.54 inches. Being that the material volume to combined void volume of the work machine tire 210 is less than that of the first and second embodiments, the tire 210 includes a thinner tread 221, but likely provides a smoother ride.

Figure 4:
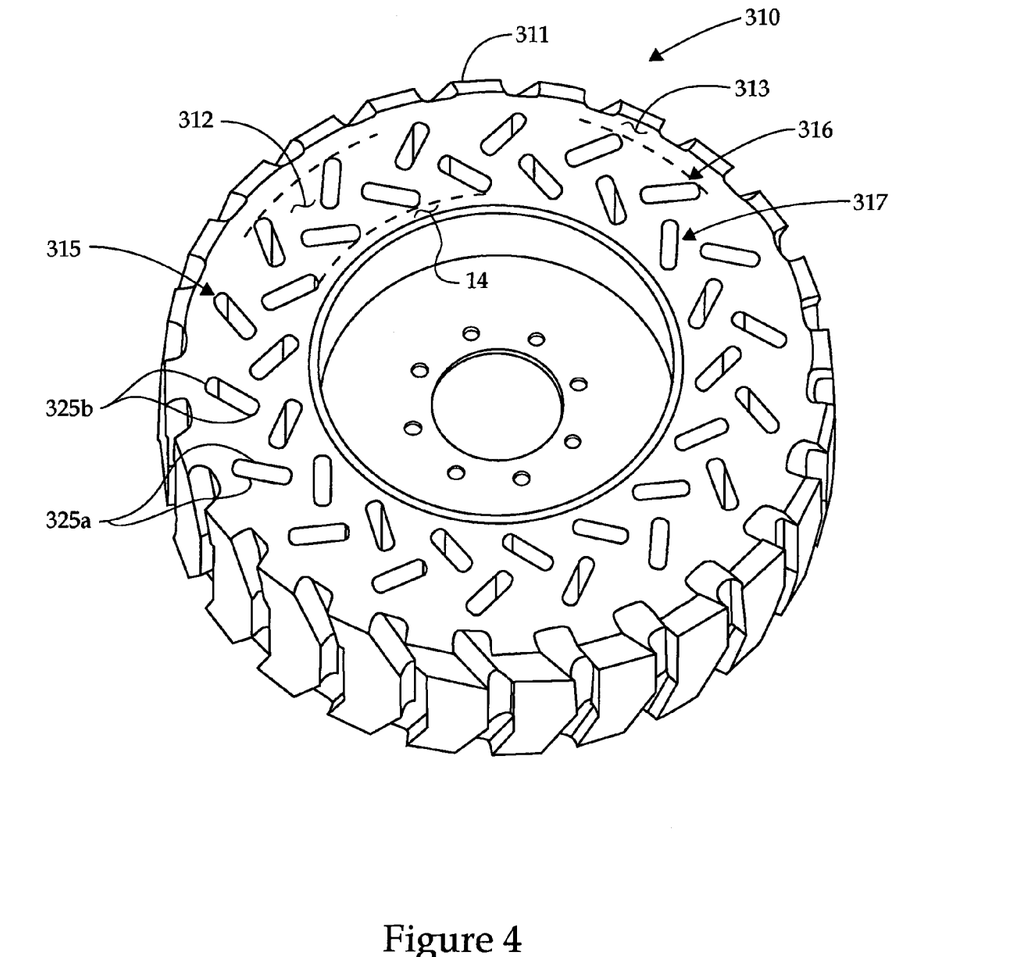
FIG. 4 is an isometric view of a work machine tire, according to a fourth embodiment of the disclosure.

Referring to FIG. 4, there is shown a work machine tire 310, according to a fourth embodiment of the present disclosure. As with the other embodiments, the work machine tire 310 includes an annular body 311 that includes a radial middle region 312 adjacent to a preferably cavity-free radial inner region 14 and a preferably cavity-free radial outer region 313. The radial middle region 312 defines a plurality of unpressurized cavities 315 that include that a first radial band of cavities 316 that are oriented at a positive angle with respect to a radius therethrough and a second radial band of cavities 317 that are oriented at a negative angle with respect to a radius therethrough. Whereas the tires 10, 110 and 210 of the first, second and third embodiments include twenty cavities in each radial band 16, 116, 216 and 17, 117, 217, the work machine 310 defines eighteen cavities in each of the first and second radial bands 316 and 317, for a total of thirty-six cavities within the plurality 315. Further, a material volume of the radial middle region 312 is 2.6 times a combined void volume of the plurality of cavities 315.

Figure 5:
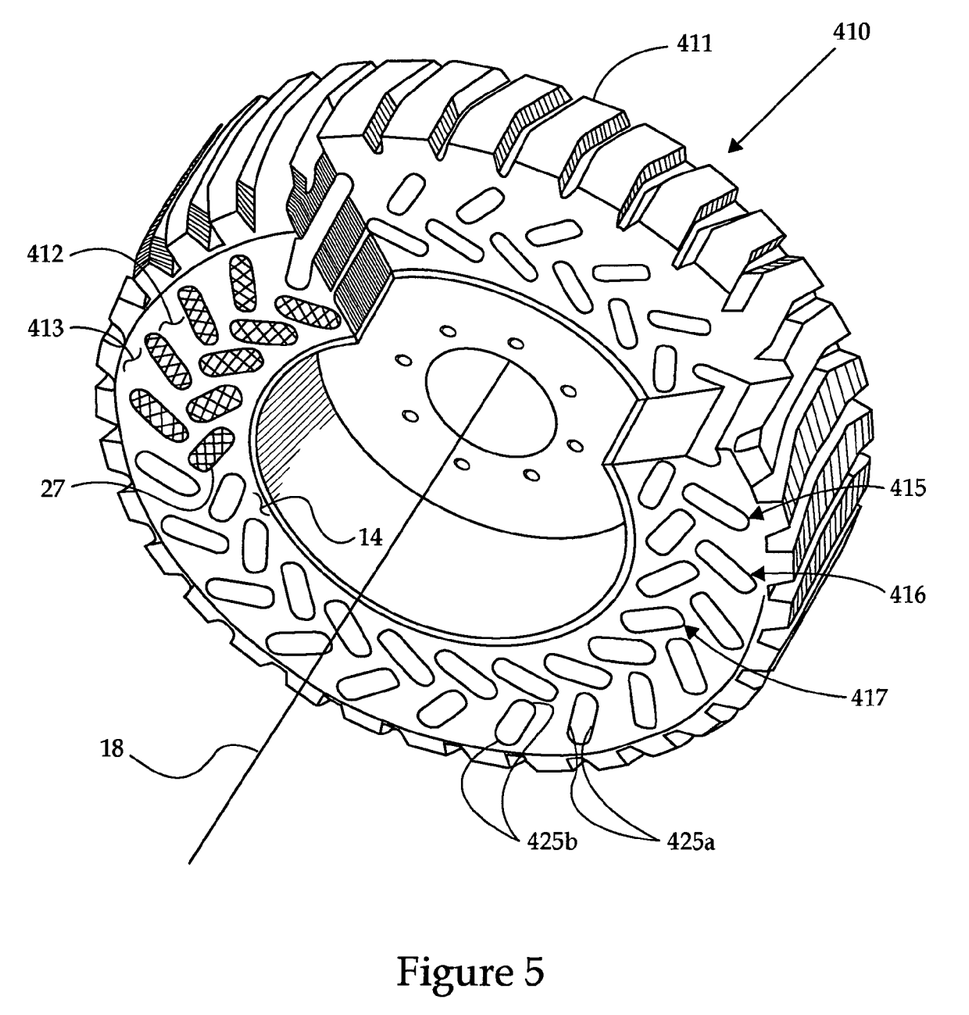
FIG. 5 is a partial cross-sectioned isometric view of a work machine tire, according to a fifth embodiment of the disclosure.

Referring to FIG. 5, there is shown a partial cross-sectioned angled view of a work machine tire 410, according to a fifth embodiment of the present disclosure. The work machine tire 410 includes an annular body 411 that includes a radial middle region 412 adjacent to a preferably cavity-free radial inner region 14 and a preferably cavity-free radial outer region 413. The radial middle region 412 defines a plurality of unpressurized cavities 415 that include that a first radial band of cavities 416 that are oriented at a positive angle with respect to a radius therethrough and a second radial band of cavities 417 that are oriented at a negative angle with respect to a radius therethrough. The work machine tire 410 includes twenty-four cavities in each of the first and second radial bands 416 and 417, for a total of forty-eight cavities 415. Further, a material volume of the radial middle region 412 is 2.1 times a combined void volume of the plurality of cavities 415. Although any embodiment of the present disclosure could include a barrier for, at least, a portion of the cavities, the work machine tire 410 is illustrated as including at least one barrier 27 separating the unpressurized cavities 415 from the space surrounding the tire 410. As can be seen, the other embodiments show cavitiesthat open through sidewalls of the respective tires. The barriers 27 prevent debris from entering the cavities 415 and affecting the performance of the tire 410. The present disclosure contemplates the barriers 27 being comprised of various materials, including, but not limited to a thin screen or rubber layer over the cavity, or possibly by filling the cavity with an elastomeric foam. Thus, the barriers 27 can be inserted into the cavities 415 or cover the opening of the cavities 415. Those skilled in the art will appreciate that the material for the barriers 27 can be selected to alter the deflection rate of the tire 410, or to not affect the performance of the tire 410.

Figure 5A:
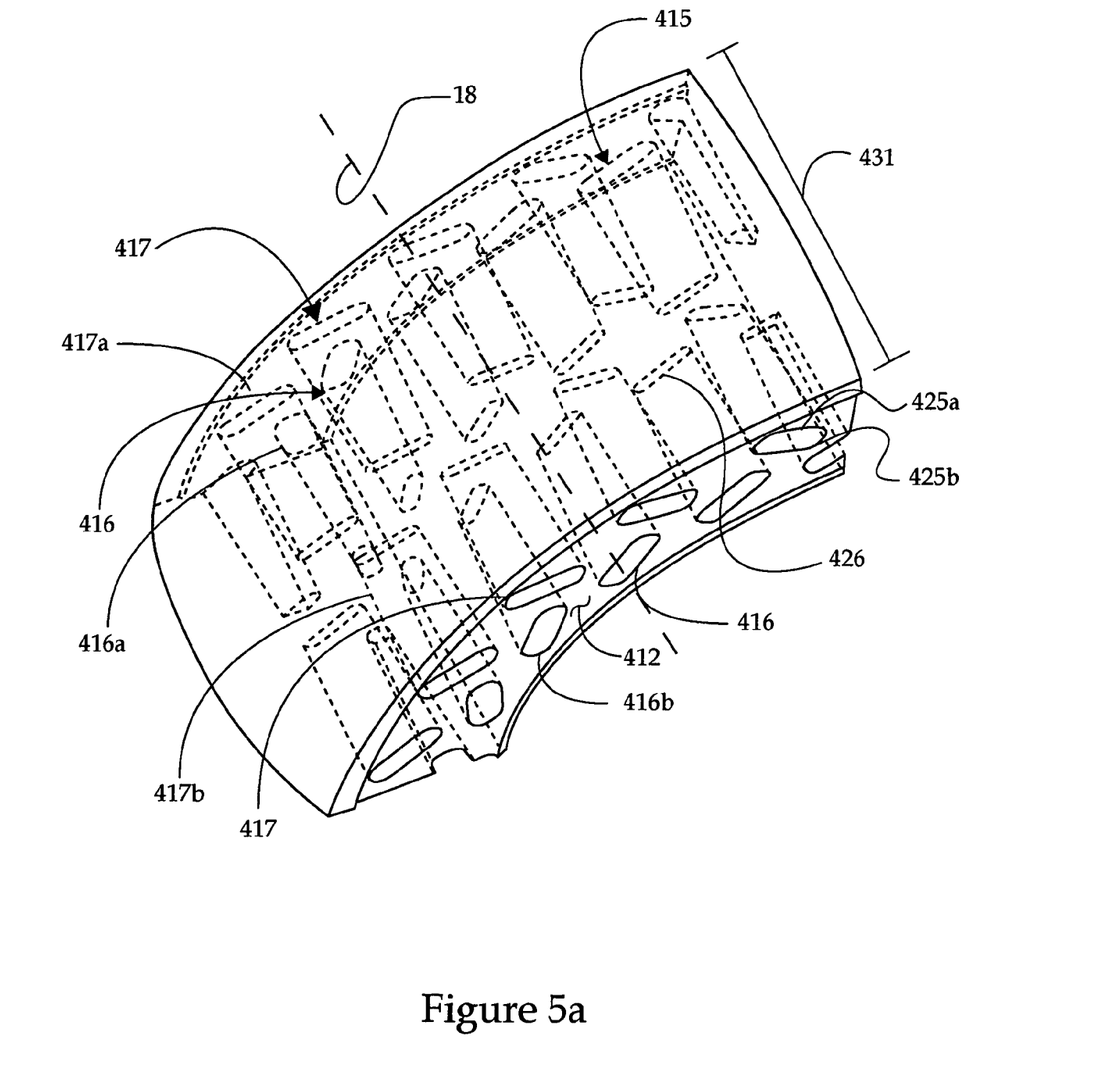
FIG. 5a is a diagrammatic representation of a portion of the work machine tire of FIG. 5.

Referring to FIG. 5a, there is shown a diagrammatic representation through a portion of the work machine tire 410 of FIG. 5. Although the present disclosure contemplates the unpressurized cavities extending through a width of the radial middle region 412, the unpressurized cavities 415 are illustrated as extending about half the width 431 of the tire 410. The first radial band of cavities 416 includes an inboard band of cavities 416a and an outboard band of cavities 416b that are out of phase with respect to the inboard band of cavities 416a about the axis of rotation 18. Similarly, the second radial band of cavities 417 includes an inboard band of cavities 417a and an outboard band of cavities 417b that are out of phase with respect to the inboard band of cavities 417a about the axis of rotation 18. Thus, the cavities 415 are evenly spread throughout the radial middle region 412 of the tire 410 in order to provide uniform performance of the tire 410 throughout 360° of rotation. Preferably, each cavity of the plurality 415 includes a tapered end 426 adjacent to the middle of the width 431 of the tire 410. The tapered ends 426 of the cavities 415 eases the removal of a molding core from the elastomeric material to form the cavities 415 during manufacturing. A taper can impart a different spring rate to the tire, and can be used to tailor the ground pressure distribution under the tire, i.e. cause the middle of the tire to carry more load.

Figures 6, 6A:
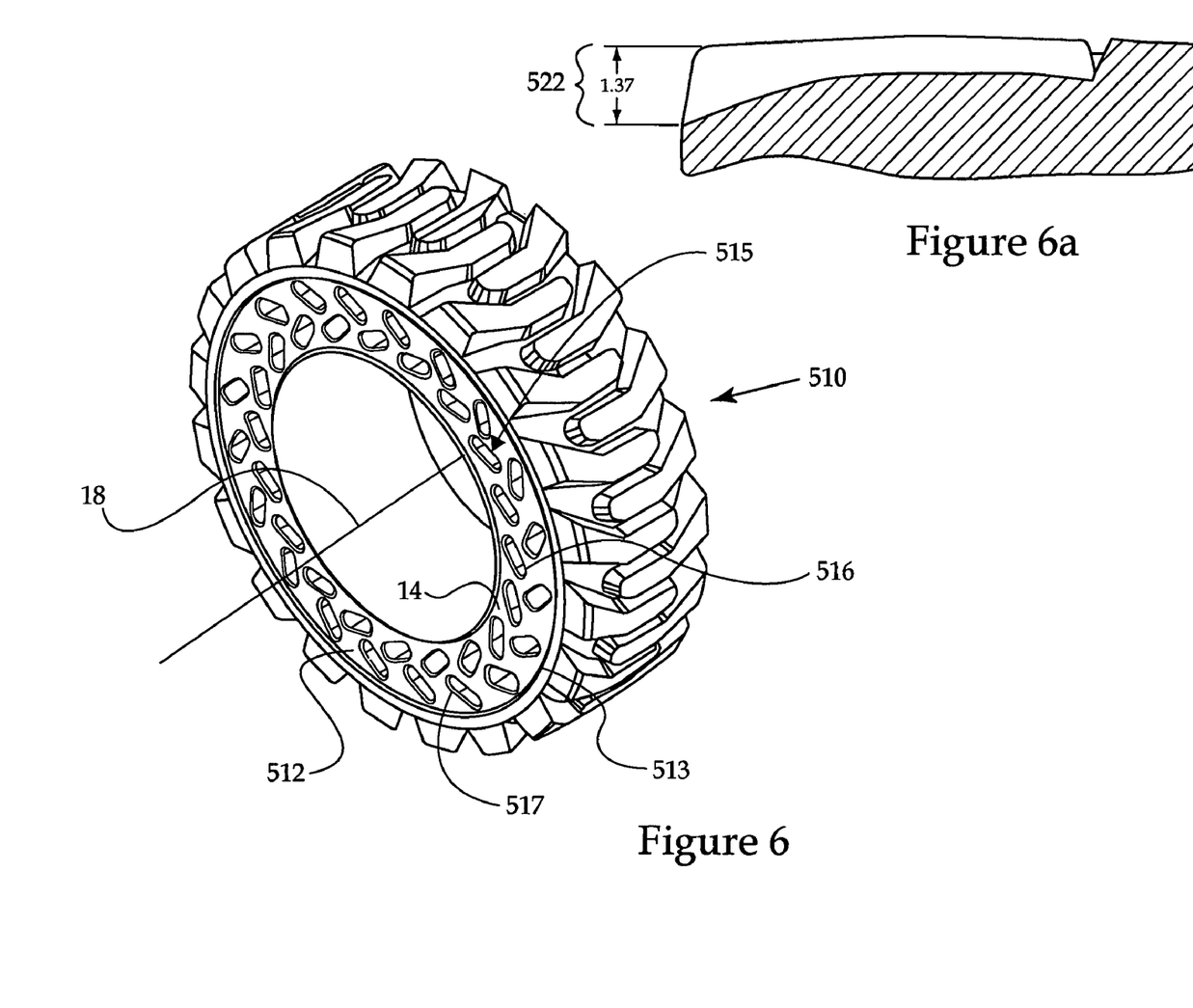
FIG. 6 is an isometric view of a work machine tire according to a sixth embodiment of the disclosure.
FIG. 6a is a cross sectional view of a radial outer or tread region of the work machine tire of FIG. 6.

Referring now to FIGS. 6 and 6a, a work machine tire 510 according to still another embodiment of the present disclosure is illustrated. Like the other tires previously described, tire 510 includes a radial inner region 14, a radial middle region 512 that includes a plurality of unpressurized cavities 415 and a radial outer region 513 that includes the tread. In this embodiment, the tread has a depth 522 of about 1.37 inches. This embodiment is similar to some of the previous embodiments in that each of the radial bands of cavities 516 and 517 each include twenty cavities. Also, this embodiment differs from the earlier embodiment in that the ratio of the material volume to the combined void volume in the middle region 412 is 1.6, which is still about twice.

Referring to Table I, there is shown data summarizing the geometry for the six embodiments of the work machine tire 10, 110, 210, 310, 410 and 510. Each work machine tire 10, 110, 210, 310, 410 and 510 are 31 inch diameter tires made for a skid steer loader.

TABLE I

| EMBOD. | TREAD DEPTH in. | STIFFNESS @4500#, lb/in | CAVITY WIDTH in. | CAVITY LENGTH in. | #HOLES /ROW | MAT'L/ VOID RATIO |
| --- | --- | --- | --- | --- | --- | --- |
| 1 | 1.74 | 4800 | 0.9 | 2.3 | 20 | 2.0 |
| 2 | 1.98 | 5500 | 0.9 | 2.2 | 20 | 2.1 |
| 3 | 1.54 | 4400 | 1.1 | 2.3 | 20 | 1.8 |
| 4 | N/A | 4300 | 0.9 | 2.8 | 18 | 2.6 |
| 5 | N/A | Probably lowest | 0.9 | 2.8 | 24 | 2.1 |
| 6 | 1.37 | 4100 | 1.1 | 2.6 | 20 | 1.6 |

However, in order to provide a desired stiffness and rubber strain, while also being able to support sufficient tread depth, the number and size of the cavities vary among the illustrated embodiments. Whereas, the work machine tire 410 of the fifth embodiment may require the thinnest tread, it may have the stiffness closest to that of a pneumatic tire. For embodiments 1, 2, 3 and 6 that all have twenty cavities per row, increasing the material volume to combined void volume ratios increases the radial stiffness and also enables that design to carry a greater tread depth. Decreasing the numbers of apertures to eighteen cavities per row, such as shown in the fourth embodiment, or increasing the number of cavities to twenty-four cavities per row, such as in the fifth embodiment, changes the material to void ratio, stiffness of the tire, elastomer strain, and tread depth. These embodiments have larger material to void ratios, but their longer cavities, radial placement, and angular orientations combine to provide less radial stiffness. Though, it should be noted that they have not been optimized for maximum tread lug depth.

Figure 7:
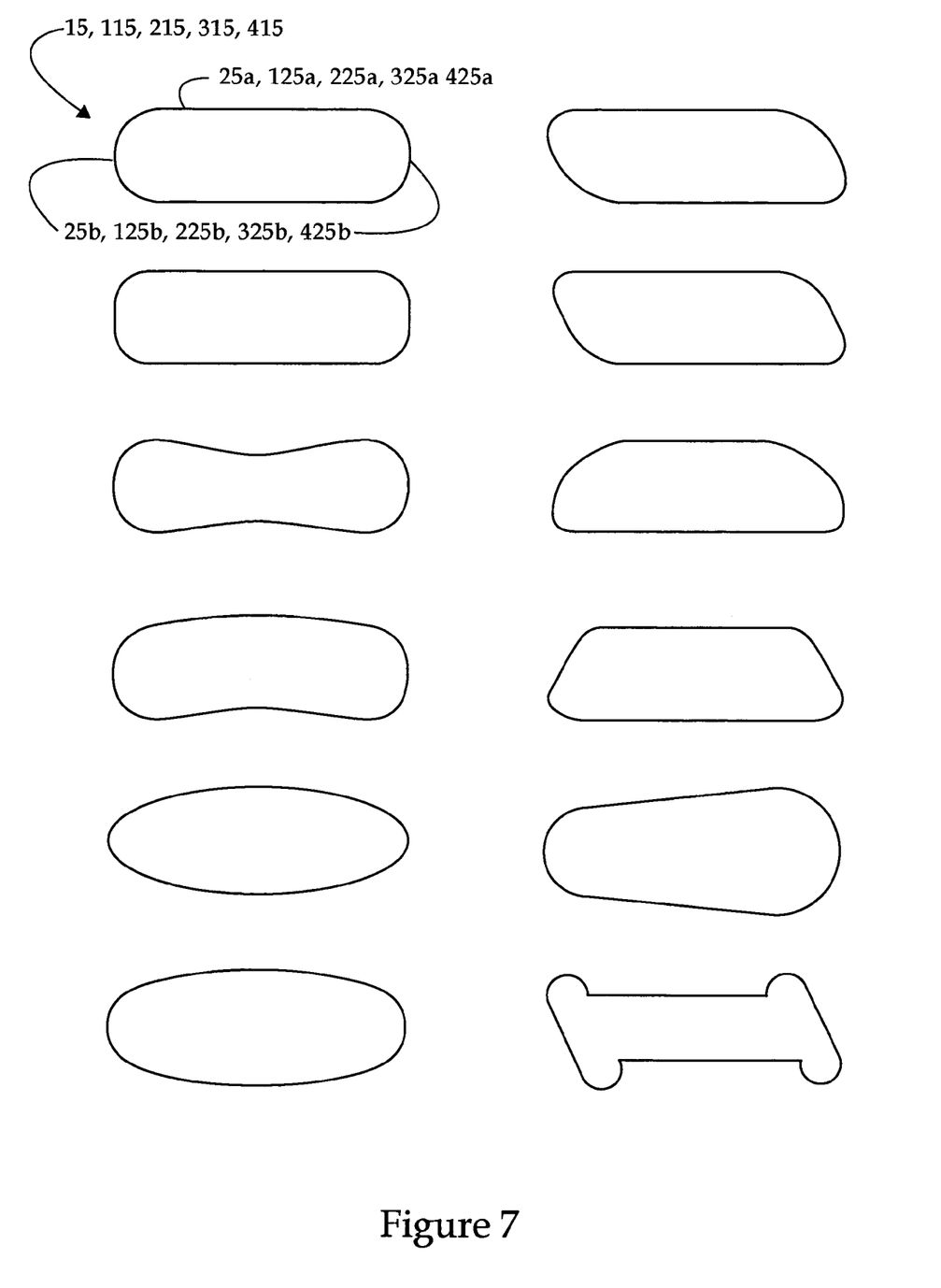
FIG. 7 is a collection of diagrammatic representations of various-shaped cavities for work machine tires, according to the disclosure.

Referring to FIG. 7, there is shown a collection of diagrammatic representations of various-shaped cavities of work machine tires, according to the present disclosure. The work machine tires 10, 110, 210, 310, 410 and 510 of the illustrated embodiments include pluralities of cavities 15, 115, 215, 315, 415 and 515 that include the preferred cross-sectional shape having the pair of straight deflectable wall portions 25a, 125a, 225a, 325a, 425a separated by the pair of symmetrical arches 25b, 125b, 225b, 325b, 425b. However, the present disclosure contemplates use of various other cavity shapes, all of which include a pair of deflectable wall portions separated by a pair of arches, including, but not limited to, those illustrated in FIG. 7. The shapes are preferably symmetrical, but can have a skewed shape. Further, the present disclosure contemplates a work machine tire including non-uniform cavities. Those skilled in the art appreciate that there are various combinations of cavity shapes that can provide the desired stiffness, torque cancellation, and durability of the work machine tire. Thus, FIG. 7 represents only a fraction of cavity shapes that are appropriate for the work machine tire.

Figure 8:
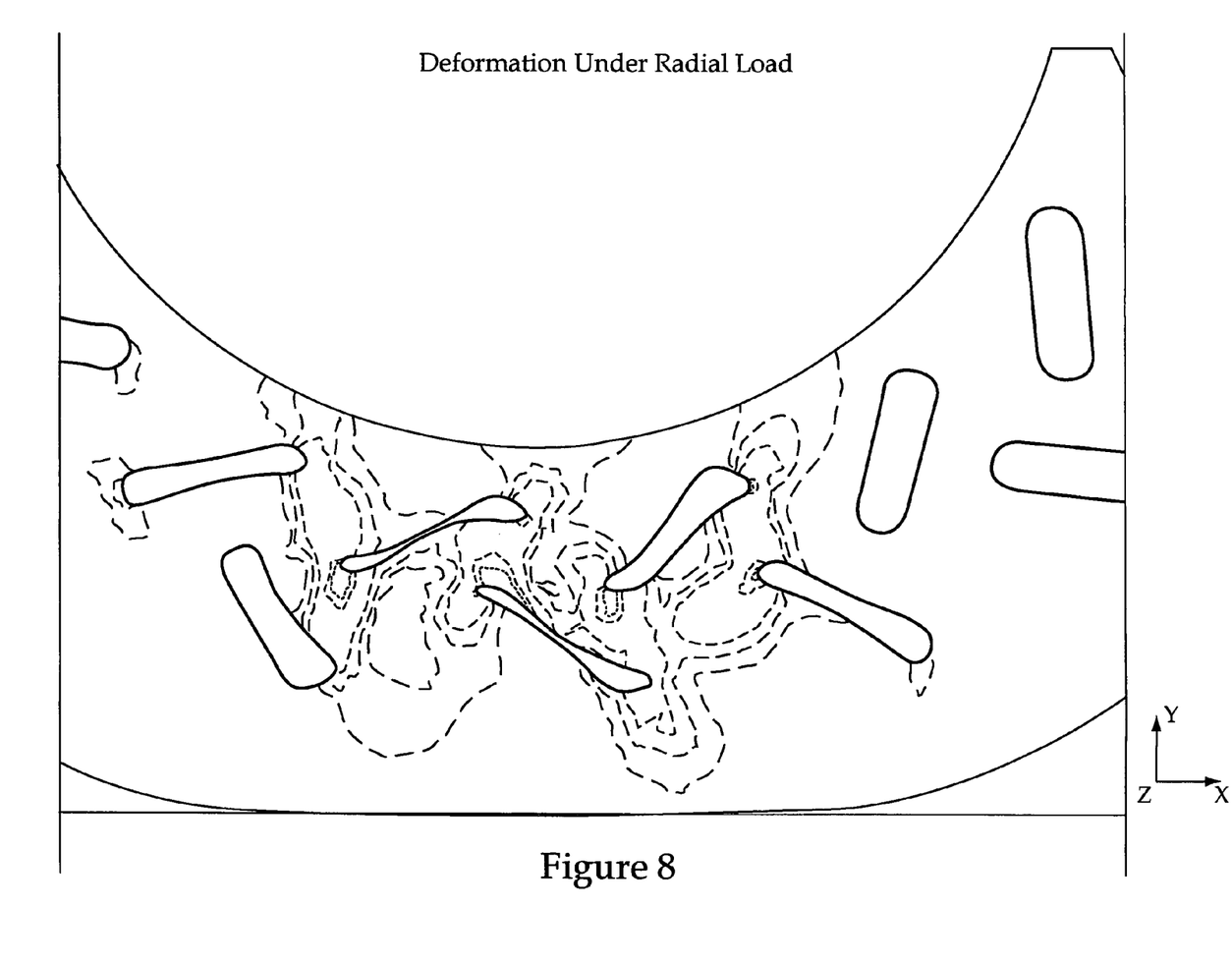
FIG. 8 is a diagrammatic representation illustrating deflection of a work machine tire under a radial load.

Referring to FIG. 8, there is shown a diagrammatic representation illustrating the deflection of a work machine under a radial load. The dotted and dashed lines show contours of constant strain in the elastomeric material out of which the tire is manufactured. As can be seen, strain appears to the largest in small regions adjacent the arches of the respective cavities. The material surrounding the cavities absorbs the radial load primarily by bending the deflectable wall portions of each cavity toward one another while the arches at the opposite ends of each cavity deform to accommodate the deflection of the wall portions. This contrasts with other solid tires that carry a load via pure compression or stretching of the tire material. Thus, the tire deflects while minimizing material strain. The work machine tire can include a progressive spring, or deflection, rate, meaning that stiffness is greater at higher radial loads than at lower radial loads. This assists the tire in supporting a load without collapsing the cavities at relatively high radial loads. However, when the tire is overloaded, the cavities can collapse such that the wall portions contact one another, and the radial load will be absorbed through the rubber-to-rubber contact in order to place an upper limit on the maximum strain for a given tire strain. For instance, for the work machine tire 10 of the preferred embodiment, the overload protection collapse of the cavities 15 occurs at approximately 6,000 pounds. Preferably, the cavities do not collapse over an expected load range for the particular tire, work machine and application.

Figure 9:
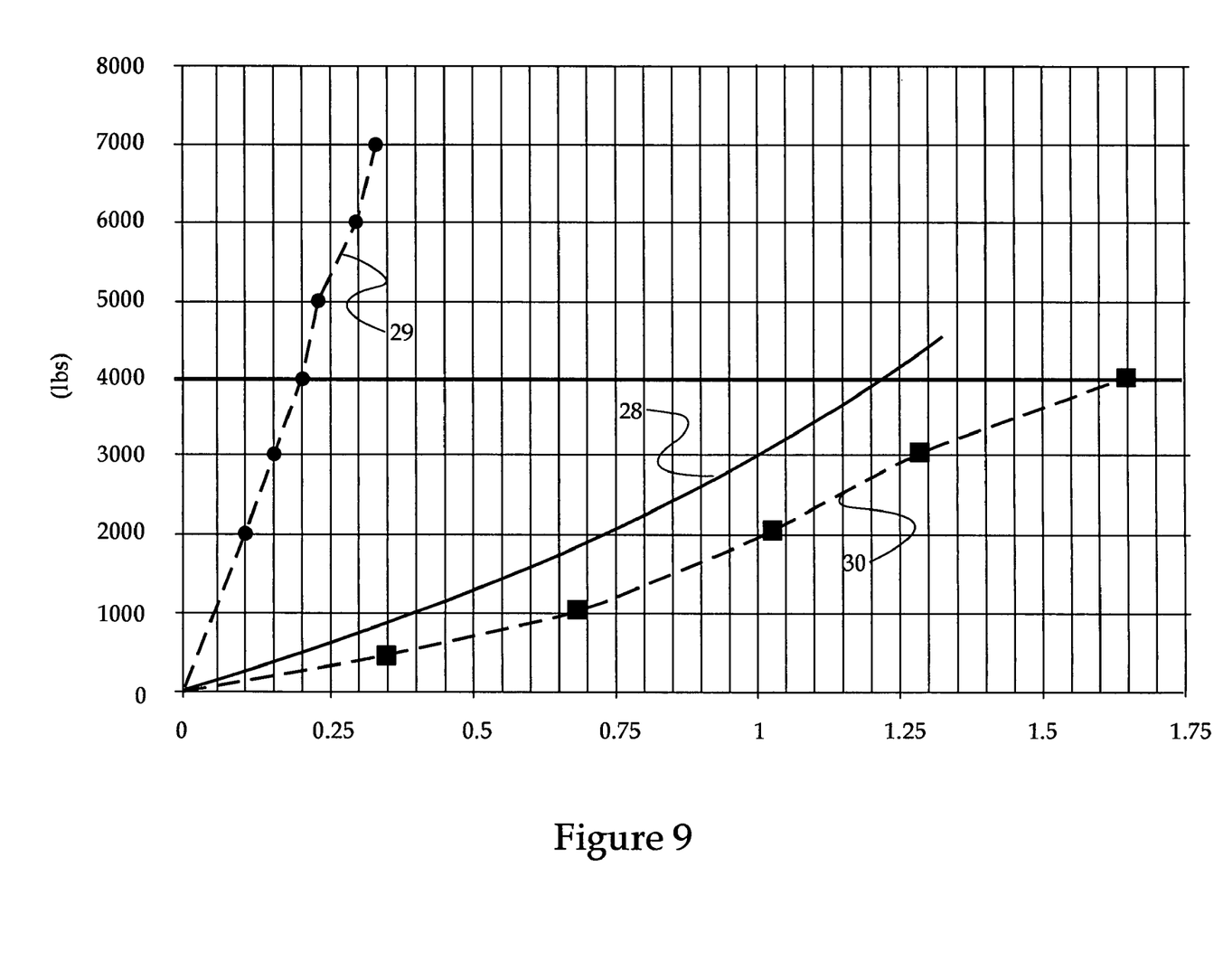
FIG. 9 is a graph illustrating a work machine tire deflection versus radial load, for comparison with solid and pneumatic tires.

Referring to FIG. 9, there is shown a graph illustrating deflection (D) of a work machine tire versus radial load (L), according to the presecurs at approximately 6,000 pounds. Preferably, the cavities do not collapse over an expected load range for the particular tire, work machine and application.

Referring to FIG. 9, there is shown a graph illustrating deflection (D) of a work machine tire versus radial load (L), according to the present disclosure. Deflection (D) is illustrated along the x-axis in inches, and the radial load (L) is illustrated along the y-axis in pounds. The upward concavity of the curve demonstrates a preferred progressive spring rate. The work machine tire 10 preferably includes an average deflection rate 28 in this skid steer example of about 0.3 inches per 1000 pounds, at least up to a load of 4000 pounds. A deflection rate 29 of a conventional solid, non-pneumatic tire is about 0.05 inches per 1000 pounds. Although the deflection rate 30 of a conventional pneumatic tire is greater than the deflection rate 28 for the work machine tire, the deflection rate 28 for the work machine tire 10 is more similar to the deflection rate 30 for the pneumatic tire than the deflection rate 29 of the solid tire.

INDUSTRIAL APPLICABILITY

Referring to FIGS. 1–9 and Table I, the operation of the present disclosure will be discussed for the work machine tire 10 illustrated in the preferred embodiment. However, those skilled in the art will appreciate that the operation of the present disclosure is similar for each work machine tire 10, 110, 210, 310, 410 and 510 illustrated in each embodiment. Further, although the operation of the present disclosure will be discussed for a 31 inch diameter work machine tire 10 for use with a skid steer loader, those skilled in the art should appreciate that the operation of the present disclosure is similar for various sized work machine tires for use with various work machines. Although the actual number, volume, shape and angle of the unpressurized cavities may vary among different sized tires for different work machine applications, in every illustrated version of the present disclosure, the material volume is more than one and a half times greater than the combined void volume, and the first radial band of cavities 16, 116, 216, 316, 416 and 516 is oriented at a positive angle with respect to a radius therethrough and the second radial band of cavities 17, 117, 217, 317, 417 and 517 is oriented at a negative angle with respect to a radius therethrough.

During normal operation of the skid steer loader, the work machine tire 10 will be subjected to a predictable range of radial loads. Under this range of radial loads, the material around the plurality of cavities 15 absorbs the radial load primarily by bending rather than by pure compression or stretching, thereby maintaining a relatively low maximum strain on the material. The deflection of the work machine tire 10 by bending the material that defines cavities 15 will cause a larger contact area with the ground, which provides increased traction. Due to the bending around the cavities 15 during normal operation of the work machine, the work machine tire 10 will have a stiffness more comparable to that of a pneumatic tire than a solid tire, and thus, provide the work machine operator with a relatively smooth ride. As illustrated in FIG. 9, the deflection rate 28 of the work machine 10 under 4000 pounds is more similar to the deflection rate 30 of a conventional pneumatic tire than the deflection rate 29 of a conventional solid tire.

However, during operation of the skid steer loader, the greater the radial load, the greater the material strain. Although the work machine tire 10 preferably includes the deflection rate of 0.3 inches per 1000 pounds up to 4000 pounds, the work machine tire 10 includes a progressive spring rate that provides protection for the work machine tire 10 and the skid steer loader. Thus, the work machine tire 10 may become stiffer at higher radial loads. Because the work machine tire 10 is stiffer at higher radial loads, the cavities 15 can remain open under the higher radial loads. However, at a point of overload, illustrated in the preferred embodiment as 6000 pounds, the cavities 15 will collapse, and the rubber-to-rubber contact will absorb the overload. The collapse will limit the strain that can be placed on the material.

During operation of the skid steer loader, there are certain situations, such as stopping the forward movement of the skid steer loader, that may create tangential forces on the work machine tire 10. These tangential forces could also occur in a typical work cycle due to traction forces from digging, pushing, pulling, etc. The material surrounding the cavities 15 oriented at opposing angles can bend to absorb the tangential force. Although each radial band of cavities 16 and 17 will have a torsional stiffness bias in the direction of their respective angles, the second radial band of cavities 17 at the negative angle can cancel the torsional stiffness bias of the first radial band of cavities 16 at the positive angle, and vice versa. Thus, the torque will not move an outer portion of the tire 10 in relation to an inner portion of the tire 10 different amounts depending on whether the tangential force from the torque is in a forward direction or a reverse direction. The opposing angles of the cavities 15 provide a balanced clockwise and counterclockwise torsional stiffness for the work machine tire.

In order to achieve a desired ride while maintaining durability under radial loads and a maximum tread depth of a work machine tire, the material volume to combined void volume can be altered. In choosing a preferred embodiment other considerations were made, including an assessment of how similar the ride would be to a pneumatic tire, whether there was adequate lateral stability (i.e. no worse than a pneumatic tire), and whether the flotation and traction approximated a pneumatic tire. Other considerations included maximizing torsional stiffness, minimizing elastomer strain and finally, maximizing the radial load at which the cavities would collapse. Although all work machine tires contemplated by the present disclosure have a material volume to void volume ratio more than one and a half, in the preferred embodiment for the work machine tire 10 for a skid steer loader, the material volume is about twice the combined void volume.

As shown in Table I, the material volume to combined void volume can be altered by altering the size, angle and number of the cavities 15. For instance, the work machine tires 10, 110, 210 of the first, second and third embodiments have different material volume to combined void volume, ratios because the size, rather than the number, of the cavities 15, 115, 215 differs among the work machine tires 10, 1 10 and 210. Although a relatively low stiffness is desirable, the decrease in stiffness and strain is limited by the normal operating radial loads and the desired tread depth. The greater the normal operating load, the greater material volume to combined void volume may be required. The decrease in stiffness is also limited by the desired depth of the tread. Although maximum depth of tread is desired for traction and wear, the deeper the tread, the greater the radial area between the outer band of cavities and the outer diameter of the tire is required. Thus, in order for the tire to include a relatively deep tread, the cavities might need to be either reduced in size or made more compact to one another. In the preferred embodiment, the depth 22 of the tread 21 is 1.74 inches. Overall, it is generally a goal to maximize tread depth while maintaining a relatively low stiffness and material strain.

Further, those skilled in the art will appreciate that the present disclosure contemplates various methods for limiting the torsional stiffness bias through the opposing radial bands of cavities. In the preferred embodiment, the radial bands of cavities 16 and 17 are at different opposing angles, 63° positive angle and 52° negative angle with respect to a radial line through the center of the cavity, but each cavity within the plurality 15 has a uniform shape and size, which may include a taper. Each cavity 15 has straight segments or deflectable wall portions 15a separated by curved segments or arches 15b that have a width of approximately 0.9 inch. The total cavity length is about 2.3 inches. However, the present disclosure contemplates the torsional stiffness bias being cancelled by altering the angles, size, number and shape of the cavities 15. For instance, the torsional stiffness bias could also be cancelled by radial bands having the same positive and negative angles, but different sizes and/or shapes. There are various patterns that will provide a balanced clockwise and counterclockwise torsional stiffness for the work machine tire. Reducing torsional stiffness bias can prevent or reduce uncontrolled forward/reverse motion of the work machine during a change of a vertical load. In addition this same factor can serve to prevent or reduce uncontrolled vertical motion from a forward or reverse torque. There is also a desire to provide equal displacements in response to forward and reverse torques. Finally, there is a desire to balance strain in the material around the cavities during forward/reverse drive torque applications.

The present disclosure is advantageous because it provides a durable work machine tire that provides a relatively smooth ride for a work machine operator, the work machine and the load. Because the material volume of the radial middle region 12 is, at least, one and a half times greater than the combined void volume of the plurality of cavities 15, the work machine tire can provide the durability required of a work machine tire in harsh environments and under relatively substantial loads. However, because the work machine tire 10 defines the plurality of cavities 15, the rubber can mostly bend, rather than purely compress or stretch, under the loads. Thus, the work machine tire 10 can also provide more deflection, creating a softer ride, at lower rubber strains. Moreover, the radial bands of cavities 16 and 17 being oriented at positive and negative angles relative to a respective radius therethrough can cancel the torsional stiffness bias of one another. Thus, the material surrounding the cavities 15 can absorb the tangential forces acting on the tire 10 while limiting the rotation of the outer portion of the tire relative to the inner portion during periods of acceleration, deceleration, and torques due to normal work cycles.

The present disclosure is also advantageous because the work machine tire 10 and work machine is protected from overload. Because the work machine tire 10 include the progressive deflection rate, the increased stiffness at higher radial loads allows the cavities 15 to remain open at the higher radial loads. However, when the tire is subjected to an overload situation, the work machine tire 10 will limit the material strain by collapsing the cavities 15. The rubber-to-rubber contact can absorb the overload but the tire then performs more like a solid tire.

Moreover, the present disclosure is advantageous because the dimensions of the radial middle region can be adjusted to fit the desired operating goals of each specific work machine tire. The compromise between tread depth and strain and stiffness can be adjusted by adjusting the material volume to combined void volume ratio. Further, the angles, size, number and shapes of the cavities can be adjusted in order to sufficiently cancel the torsional stiffness bias of the radial band of cavities and produce other known performance characteristics.

It should be understood that the above description is intended for illustrative purposes only, and is not intended to limit the scope of the present disclosure in any way. Thus, those skilled in the art will appreciate that other aspect, objects, and advantages of the disclosure can be obtained from a study of the drawings, the disclosure and the appended claims.

What is claimed is:

1. A work machine tire, comprising:
an annular body of elastomeric material that includes a radial middle region having a material volume and defining a plurality of unpressurized cavities with a combined void volume, and being distributed in a pattern that includes a first radial band of cavities and a second radial band of cavities;
each cavity of said first radial band of cavities being oriented at a positive angle with respect to a radius line extending from a tire axis of rotation through the respective cavity;
each cavity of said second radial band of cavities being oriented at a negative angle with respect to a radius line extending from the time of axis of rotation through the respective cavity; and
said material volume being more than one and a half times greater than said combined void volume.

2. The work machine tire of claim 1 having an average deflection rate that is about 0.3 inches per 1000 pounds at least up to a load of 4000 pounds.

3. The work machine tire of claim 1 wherein said unpressurized cavities each have an axis of symmetry parallel to a tire axis of rotation.

4. The work machine tire of claim 1 wherein said unpressurized cavities have a uniform shape and volume.

5. The work machine tire of claim 4 wherein each of said radial bands has twenty cavities.

6. The work machine tire of claim 1 wherein a total number of unpressurized cavities is less than fifty.

7. The work machine tire of claim 1 wherein said unpressurized cavities each have a cross-sectional shape with a perimeter that includes a pair of straight segments separated by a pair of curved segments.

8. The work machine tire of claim 1 including at least one barrier separating said unpressurized cavities from space surrounding the tire.

9. The work machine tire of claim 1 wherein said first radial band of cavities includes an inboard band of cavities and an outboard band of cavities that are out of phase with respect to said inboard band of cavities about a tire axis of rotation.

10. The work machine tire of claim 1 wherein said unpressurized cavities extend a majority of a width of said radial middle region.

11. The work machine tire of claim 1 wherein said material volume is about twice said combined void volume.

12. The work machine tire of claim 1 wherein said annular body includes a cavity-free radial outer region adjacent said middle region that includes an exposed off-road tread pattern.

13. The work machine tire of claim 12 wherein said off-road tread pattern has a tread depth that is at least one inch.

14. The work machine tire of claim 12 wherein said annular body includes a cavity-free radial inner region adjacent said middle region.

15. The work machine tire of claim 12 wherein a total number of unpressurized cavities is less than fifty.

16. The work machine tire of claim 15 wherein said unpressurized cavities each have a cross-sectional shape with a perimeter that includes a pair of straight segments separated by a pair of curved segments.

17. The work machine tire of claim 16 wherein said unpressurized cavities have a uniform shape and volume.

18. The work machine tire of claim 17 wherein each of said radial bands has twenty cavities.

19. The work machine tire of claim 18 wherein said material volume is about twice said combined void volume.

20. The work machine tire of claim 19 having an average deflection rate that is less than 0.3 inches per 1000 pounds at least up to a load of 4000 pounds.

21. A tire comprising:
   an annular body of elastomeric material that includes a radial middle region defining a plurality of unpressurized cavities that are distributed in a pattern that includes a first radial band of cavities and a second radial band of cavities;
   each cavity of the first radial band of cavities being oriented at a positive angle with respect to a radius line extended from a tire axis of rotation through the respective cavity;
   each cavity of the second radial band of cavities being oriented at a negative angle with respect to a radius line from the tire axis of rotation through the respective cavity;
   each of said plurality of cavities being defined by first and second arches connected by first and second deflectable wall portions.

22. The tire claim 21 wherein said plurality of cavities are sized and arranged such that a radial load causes said first and second wall portions to deflect towards one another in an area adjacent said load.

23. The tire of claim 1 wherein the unpressurized cavity open through a side wall of the tire.

24. The tire of claim 1 wherein the positive angle and the negitive angle have different magnitudes.

25. The tire of claime 21 wherein the unpressurized cavities open through a side wall of the tire.

26. The tire of claim 21 wherein the positive angle and the negitive angle have different magnitudes negitive.

* * * * *